United States Patent [19]
Annecharico et al.

[11] Patent Number: 5,810,977
[45] Date of Patent: Sep. 22, 1998

[54] PURIFYING WATER BY SUPERHEATED STEAM

[75] Inventors: Robert L. Annecharico, Clinton; Norman C. Campbell, Shelton, both of Conn.

[73] Assignee: Aqua Health International Ltd., Clinton, Conn.

[21] Appl. No.: 701,853

[22] Filed: Aug. 23, 1996

Related U.S. Application Data

[63] Continuation-in-part of Ser. No. 342,620, Nov. 21, 1994, Pat. No. 5,549,078.

[51] Int. Cl.$^6$ ..................................................... B01D 3/00
[52] U.S. Cl. ...................... 203/10; 203/11; 202/164; 202/176; 202/180; 122/2; 122/4 A; 122/13.1; 122/130; 122/486
[58] Field of Search ........................ 203/10, 11, DIG. 17, 203/DIG. 24; 202/164, 176, 180; 122/130, 2, 4 A, 4 R, 13.1, 13.2, 486, 487, DIG. 11

[56] References Cited

U.S. PATENT DOCUMENTS

| | | | |
|---|---|---|---|
| 2,467,393 | 4/1949 | Leher | 219/39 |
| 4,045,293 | 8/1977 | Cooksley | 203/10 |
| 4,052,267 | 10/1977 | McFee | 203/10 |
| 4,427,495 | 1/1984 | Masero | 203/11 |
| 4,643,832 | 2/1987 | Iniotakis et al. | 210/712 |
| 4,861,435 | 8/1989 | Sweet, Jr. | 202/180 |
| 4,917,770 | 4/1990 | Asbury et al. | 202/176 |
| 4,946,558 | 8/1990 | Salmon | 202/167 |
| 5,178,734 | 1/1993 | Palmer | 202/176 |
| 5,571,385 | 11/1996 | Faur et al. | 203/10 |
| 5,632,864 | 5/1997 | Enneper | 202/197 |

FOREIGN PATENT DOCUMENTS

| | | |
|---|---|---|
| 2 260 749 | 9/1975 | France . |
| 44 10 570 | 6/1995 | Germany . |
| WO 96 16297 | 5/1996 | WIPO . |

*Primary Examiner*—Timothy McMahon
*Attorney, Agent, or Firm*—Foley & Lardner

[57] ABSTRACT

A water purifier which purifies water by superheated steam. The water purifier includes a raw water reservoir for contaminated water; a heater at least partially disposed within the raw water reservoir and including a heat source, an inlet for steam and an outlet for superheated steam; an inlet conduit in fluid communication with the inlet of the heater for transporting steam produced by boiling said raw water; and a condenser in fluid communication with the outlet of the heater. The heater both boils the raw water to produce a substantially saturated steam and superheats the substantially saturated steam. The water purifier can further include a purified water reservoir in fluid communication with the condenser.

39 Claims, 11 Drawing Sheets

PURIFYING WATER BY SUPERHEATED STEAM

CROSS-REFERENCE TO RELATED APPLICATIONS

This application is a continuation-in-part of Ser. No. 08/342,620, filed Nov. 21, 1994 now U.S. Pat. No. 5,549,078.

BACKGROUND OF THE INVENTION

1. Field of the Invention

The present invention relates to water purification. More particularly, the present invention relates to an apparatus and process for purifying water by steam superheating.

2. Description of the Prior Art

Many techniques have been employed for the treatment of impure water so as to provide a potable water supply. Generally the most widely employed techniques utilize distillation of one form or another, with wide variations in the source of heat energy being employed. Typically, heat energy is applied to the water by a first heating device which vaporizes the steam. In addition to vaporizing the water into steam, it has been known in the prior art to employ a second heating device to superheat the steam produced by the first heating device. An example of such a water purification apparatus is disclosed in U.S. Pat. No. 4,045,293 to Cooksley.

Cooksley discloses a water purification apparatus capable of treating water having impurities producing substantial foaming which includes a boiler tank having a water inlet and a first heater for boiling the water within the water tank. A stack portion above the tank contains contact surfaces. A second heater is provided for heating the contact surfaces to a temperature above the vaporization temperature of water. In this manner water droplets which may be carried by the steam vapors from the boiler and/or foam will be immediately vaporized as it comes in contact with the contact surfaces. The steam vapors pass through a condenser assembly, and the condensate passes through a filter assembly before storage in a tank. The contact surfaces desirably comprises screen members providing a tortuous path and high heat conductivity. Baffle members may be interposed in the flow path for vapors from the boiler tank to the stack. Valves and a control circuit are desirably included to automatically control the volume of water in the boiler, to cut off water flow to components and to drain the assembly upon shutdown.

One of the major impediments to use of distillation involving rapid boiling of the water is the tendency for foaming to occur with certain types of contamination. This foaming often will require excessively large dimensions for the boiler or an intricate and elongated passage from the boiler to the condenser. Moreover, even with water feedstocks which do not evidence substantial foaming, rapid boiling will frequently produce a tendency for water droplets which are carried by the steam vapors into the condenser. As will be readily appreciated, foam droplets will exhibit the contamination of the feedstock and thereby contaminate the condensate which is produced.

In an attempt to eliminate the contamination posed by the feedstock, the prior art devices have employed a second superheating heater as described in Cooksley.

Another problem which is frequently encountered involves the contamination of the water supply by organic compounds which vaporize along with the water in the boiler. Exemplary of such contaminants are carbon tetrachloride and chloroform which result from chlorination of water supplies containing dissolved methane and other hydrocarbons.

Various types of water purification devices have been suggested for providing potable water in the home, or on shipboard, or in other locations. Many of these devices require substantially continuous operation for efficiency, others require substantial investments, and still others require extensive maintenance from time to time.

SUMMARY OF THE INVENTION

One object of the present invention is to provide a water purification system which overcomes the disadvantages of the art described above. Still another object of the present invention is to provide a heater for use in a water purification apparatus which can both boil water to produce steam, and which can superheat the steam. Yet another object of the invention is to provide a water purification system which purifies water by superheated steam. Yet another object is to provide a method for purifying water by superheated steam. Still another object of the present invention is to provide a water purification device which may be simply and ruggedly constructed to provide a durable, inexpensive and readily serviceable unit.

Another object is to provide such a device which is capable of substantially eliminating dissolved gaseous contaminants from water feedstock.

A further object is to provide a device whereby water feedstock containing impurities may be rapidly and efficiently vaporized without carry-over contamination in the vapor.

The foregoing and other objects of the present invention are achieved according to one aspect of the present invention which comprises a water purification device, which includes: a raw water reservoir; a heater at least partially disposed within the raw water reservoir and including a heat source; an inlet for steam and an outlet for superheated steam; an inlet conduit in fluid communication with the inlet of the heater for transporting steam produced by boiling said raw water; and a condenser in fluid communication with the outlet of the heater, wherein the heater both boils the raw water to produce a substantially saturated steam and superheats the substantially saturated steam.

According to another aspect of the present invention, there has been provided a water purification system which includes the water purification device and a purified water reservoir in fluid communication with the condenser.

According to still another aspect of the present invention there has been provided a method for purifying water, which includes: providing a reservoir of raw water; boiling the raw water within the reservoir with a heater at least partially disposed within the water to produce steam in a substantially saturated state; transporting the steam to the interior of the heater; heating the steam within at least a portion of the heater for a time and temperature sufficient to superheat the steam; transporting at least a portion of the superheated steam to a condenser; and condensing at least a portion of the transported steam, to produce a purified water.

Further objects, features and advantages of the present invention will become apparent to those skilled in the art from consideration of the detailed description of preferred embodiments which follow.

DETAILED DESCRIPTION OF THE PREFERRED EMBODIMENTS

Figure 1:
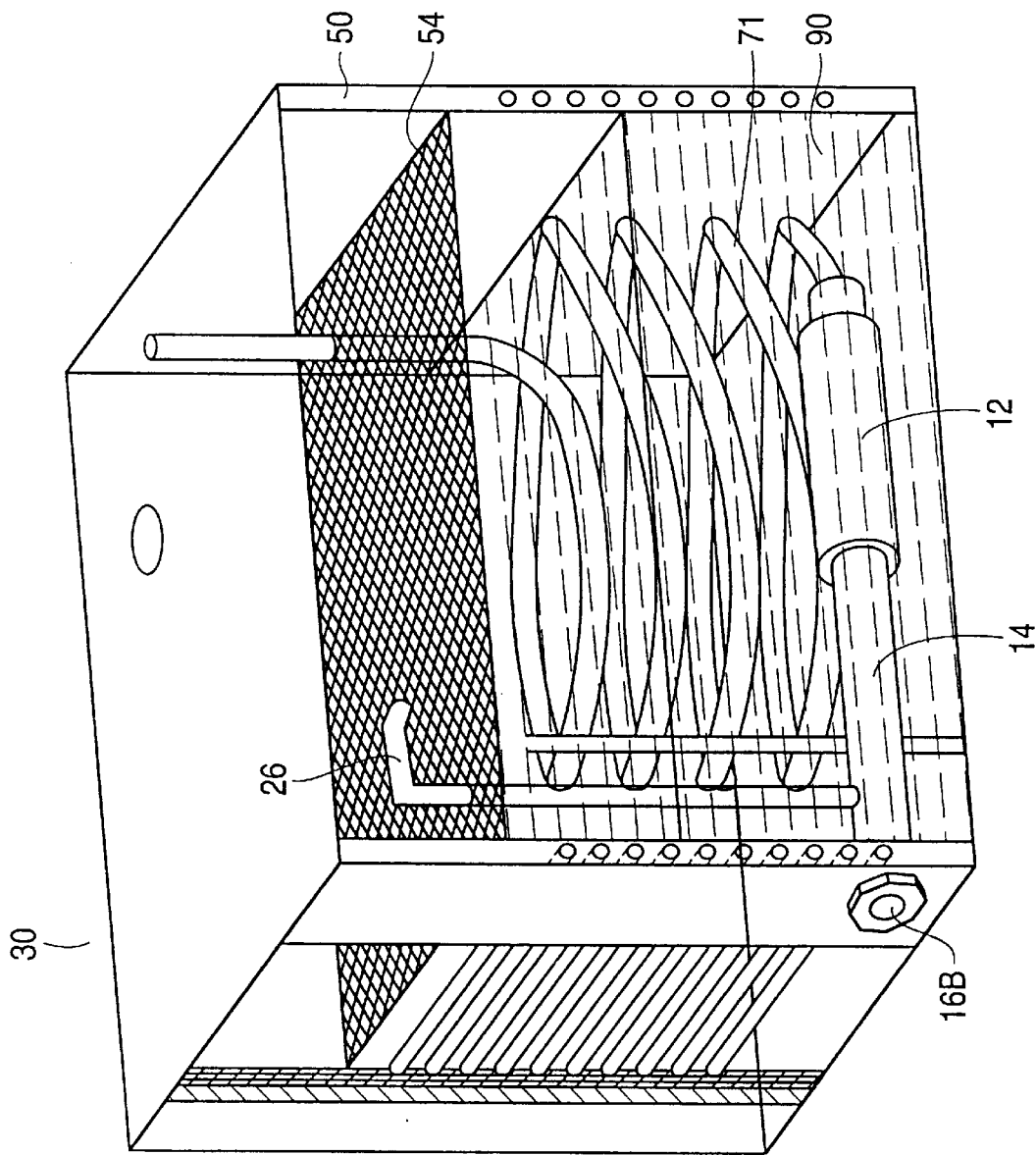
FIG. 1 is a cutaway view of one embodiment of the water purification device.

The present invention is directed to a water purification device for breakdown, removal and/or destruction of a wide range of organic and inorganic contaminants or impurities and organisms often found in water, even in well and municipal tap water.

As used herein, "raw water" is used to generically describe any source of water prior to its purification in the purification device according to the present invention, such as tap water, ground water, water from a body of water such as a river, ocean, or lake and the like.

As used herein, "impurities" or "contaminants" are used to broadly describe any unwanted component present in water and can include organic and inorganic chemicals, along with organisms such as disease causing parasites and bacteria.

As used herein, "breakdown, removal and/or destruction" of contaminants or impurities is broadly defined as including the chemical breakdown of a molecular impurity into a simpler molecule or element which is non-toxic or less toxic than the original molecular impurity or contaminant. The breakdown can be through auto-ignition or any other chemical reaction which occurs as the result of the high temperatures of the superheated steam. In the sense of an organism, "breakdown, removal and/or destruction" includes the same definition as above, and also includes the cessation of cellular functions by exposure to high temperatures.

The device includes a raw water reservoir, which may be in the form of a holding tank or other equivalent means. While the raw water reservoir generally operates at around atmospheric pressure, it is contemplated that in some embodiments, a pressurized reservoir may be advantageous. The reservoir may also be connected to a source of raw water, such as being plumbed into a tap water line of a building. The reservoir may also include other features, described below in more detail.

Located within the raw water reservoir is the heater. The heater has the function of both superheating steam and boiling the water in the raw water reservoir. In a preferred embodiment, this is accomplished by dividing the heater into two sections, with one section producing saturated steam and the other section superheating the saturated steam.

In another preferred embodiment, the heater includes a water-tight interior space which is in fluid communication with the saturated steam produced in the raw water reservoir. The interior space may be divided into two sections, with a first section having the material between the interior space and outside of the heater which is disposed in the raw water, having a higher thermal conductivity than a second section. The first section is mainly used to boil the water in the reservoir, whereas the other section is used to superheat the steam. However, in embodiments where the steam passes through the first section, some superheating of the steam may take place, although generally not to the extent that it will in the second section.

Alternatively, the interior space is divided into a first space which at least partially surrounds a second space in a direction extending the length of the heater. The first space which lies closer to the raw water in the reservoir, is mainly used to boil the raw water. The second space which is more insulated from the raw water is mainly used to produce the superheated steam. In embodiments where the steam passes through the first as well as the second space, some superheating of the steam will take place, although generally not to the extent that it will in second space.

The heat source can be electric, a combustion burner which burns a hydrocarbon solid, liquid or gas, or any other source of energy capable of creating sufficient heat to produce saturated steam and superheated steam.

After superheating, the superheated steam exits the heater and proceeds to a condenser means which is in fluid communication with the heater. In the condenser, the superheated steam is cooled down to a temperature at which it condenses. Preferably, the condensed purified water is further cooled to a usable temperature. In a preferred embodiment, the condenser means includes a portion arranged in the raw water reservoir such that it extends through the liquid water therein. This provides a cooling effect for the superheated steam and provides heat to the boiling water in the reservoir.

In another aspect of the invention, the water purification device is part of a water purification system which also includes a pure water reservoir for holding the purified water which exits from the condenser means. The pure water reservoir may include further means for refrigerating the pure water or maintaining the pure water at an elevated temperature.

The water purification device and system can be designed for any particular application. For example, the water purification device or system may small enough to fit on a countertop for home use. Or the device or system may be large enough for use in industry, such as hospitals or any other industry (e.g., semiconductor manufacturing) which requires highly purified water.

Figure 2:
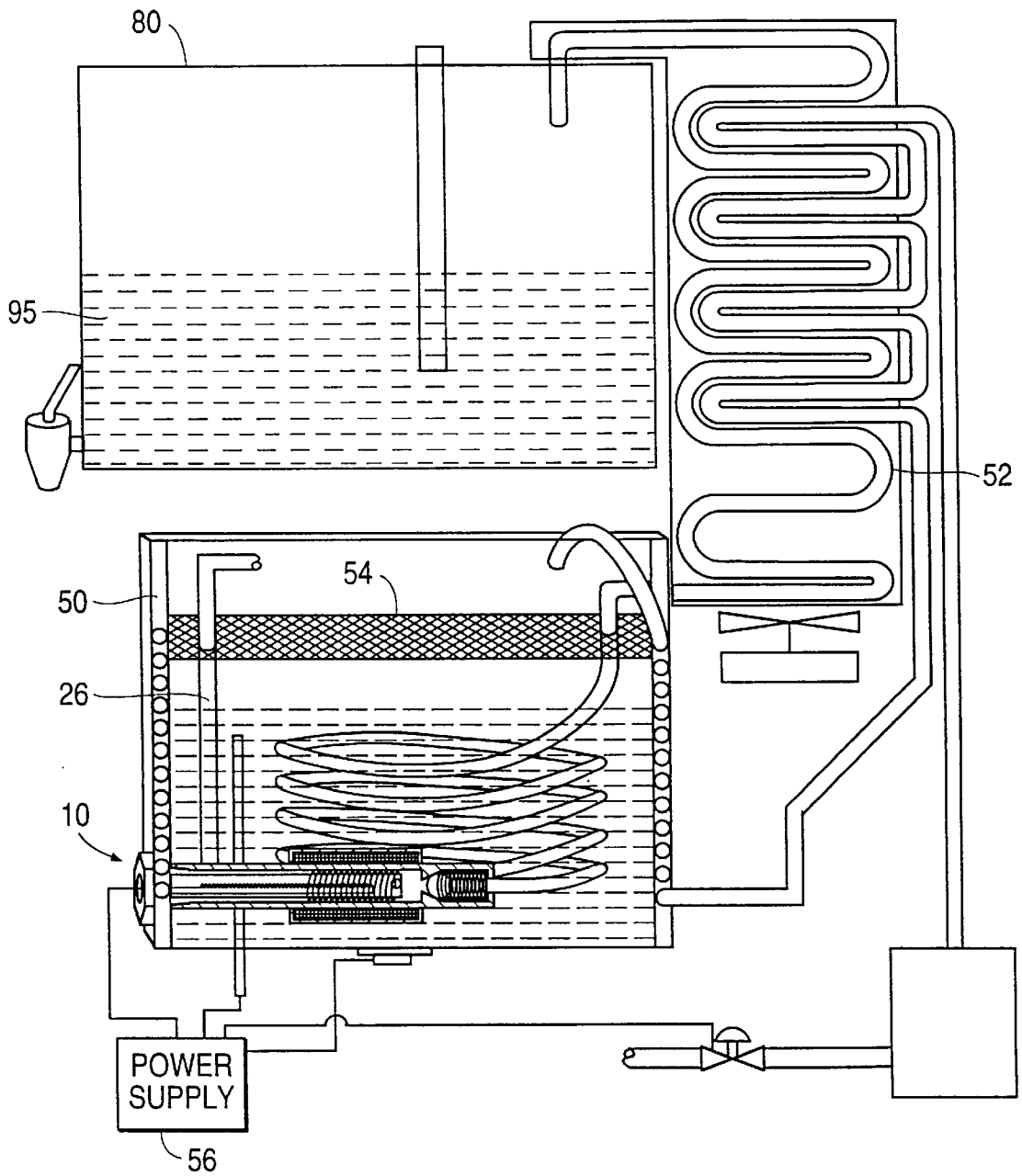
FIG. 2 is a perspective view of an embodiment of a water purification system which includes the device shown in FIG. 1 together with a water storage reservoir and dispenser.

Reference will now be made to particularly preferred embodiments of the present invention. FIGS. 1 and 2 illustrate a water purification device 30 and system 85 according to one embodiment of the present invention. The device includes a heater 10 for boiling the water and superheating steam and which is described in more detail with reference to FIGS. 7–10. The water purification device further includes raw water boiling tank 50 containing a volume of feedstock water 99 therein and a superheated steam conduit or precooling coil 71 in communication with the outlet port 14C (FIG. 7) to direct the superheated steam to an external condenser assembly (not shown). A baffle plate 54 may be disposed within the tank 50 above the water 90 and functions to provide a surface in which suspended water droplets and contaminants can be screened from the steam.

Figure 7:
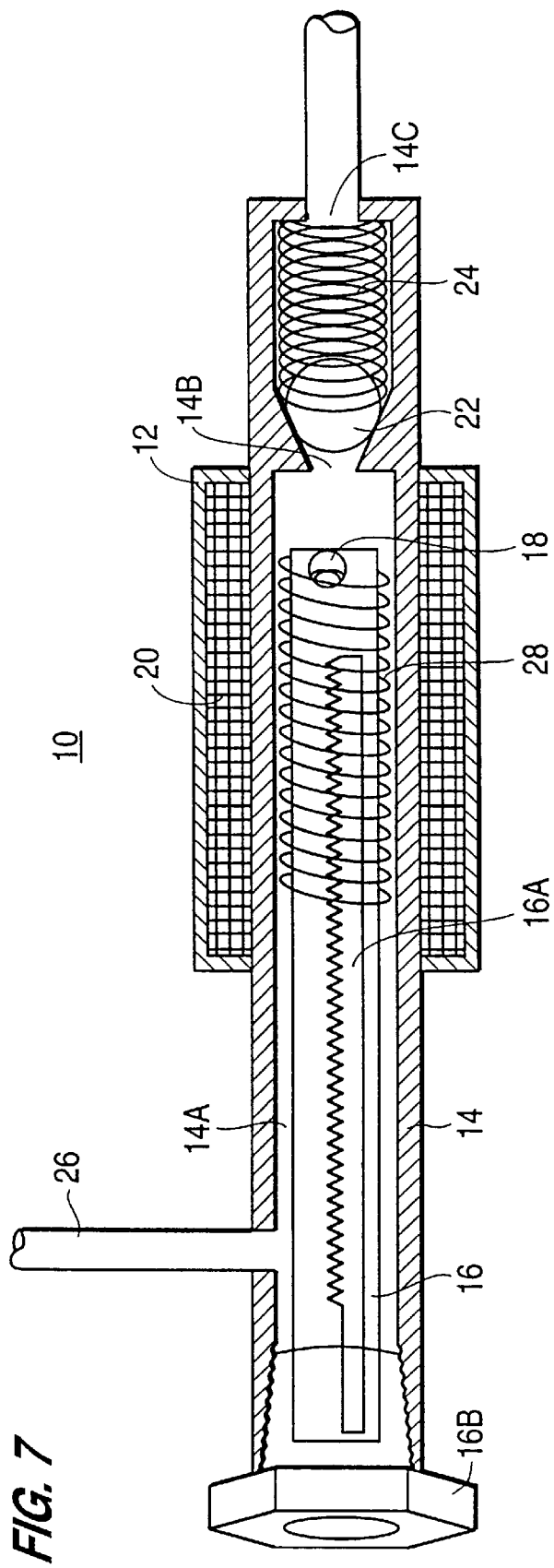
FIG. 7 is a side cutaway view of a heater constructed in accordance with one preferred embodiment of the present invention.

A power supply 56 is in electrical communication with the heater 10 and the thermocouple 18 (FIG. 7). The water purification device 30 is adapted to heat the contaminated water 90 contained within the raw water boiling tank 50 to a boil to produce steam. The steam is introduced into the heater 10 wherein the steam is superheated into vapor. The vapor is then condensed into purified water 95 and held within purified water reservoir 80 to provide the water purification system 85 according to the present invention.

FIGS. 3–7 illustrate a water purification device 30 according to another embodiment of the present invention. A raw water boiling tank 50 contains the supply of raw water to be purified. The raw water is introduced through raw water inlet 51 (FIG. 5) connected to a feedstock 99 which may be plumbed into the water supply plumbing of the structure in which the water purifier is used. Optionally, the water level in the tank 50 may be maintained by periodic or manual filling. The tank also includes a drain valve 52 (FIG. 6), such as a stop cock, to drain the tank, for periodic cleaning or maintenance, if necessary.

Tank cover 55 is placed over the top of tank 50 to prevent evaporation of water boiled in tank 50 and to prevent additional contamination of the raw water. Alternatively, a one piece tank such as a molded plastic may be used which obviates the need for a separate cover. Such a configuration would preferably include access ports for access to the components located in tank 50. If a cover is used, the cover is preferably made from a transparent material such as tempered glass or a clear plastic such a polycarbonate or polymethylmethacrylate. The cover may be surrounded by a frame 56 and attached thereto by screws 57.

Figure 3:
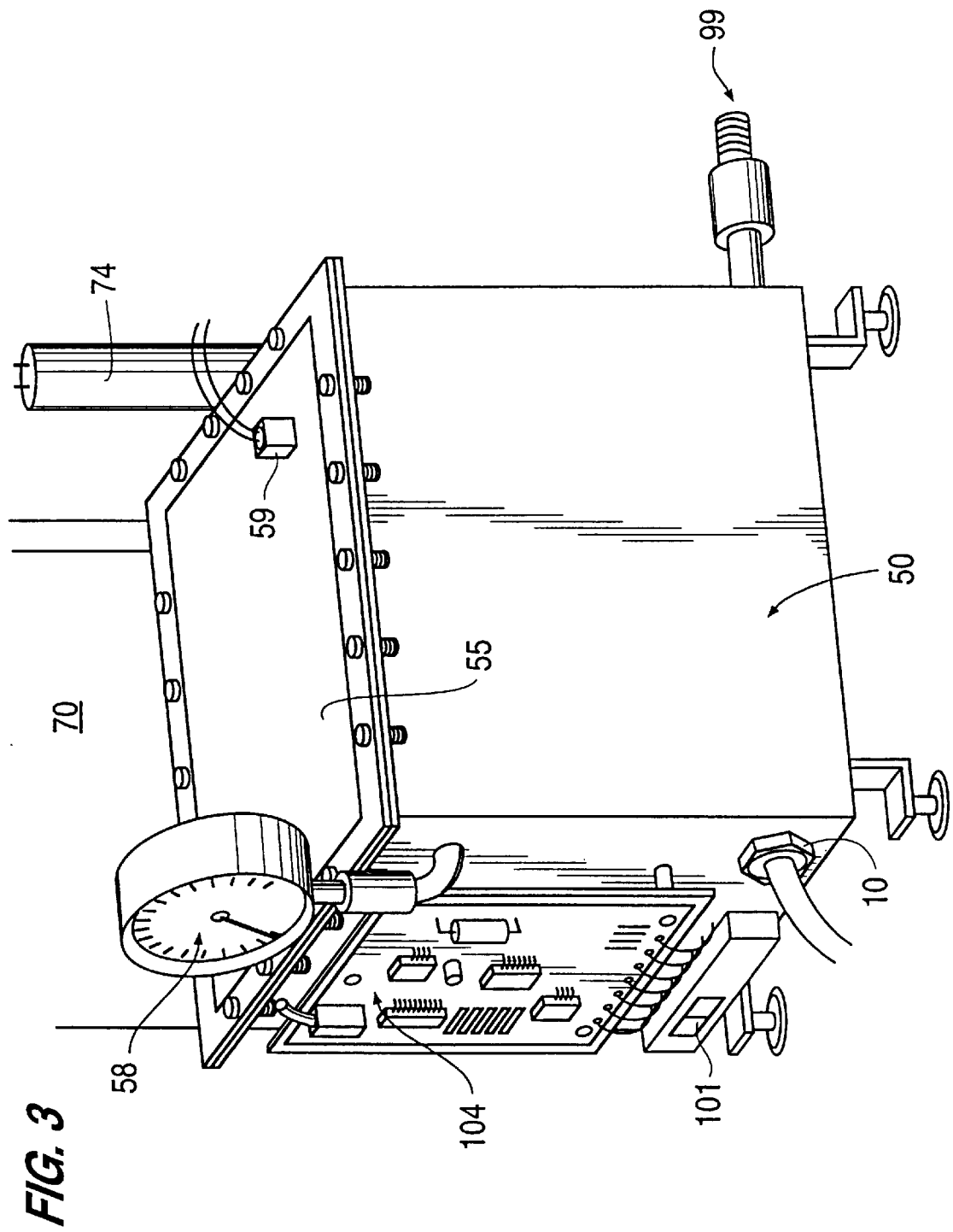
FIG. 3 is a front perspective view of the water purification device according to another embodiment of the present invention.

A pressure gauge 58 as shown in FIG. 3 may be used to monitor the pressure inside the tank 50 and heater 10. In some embodiments the pressure in tank 50 will depend on the natural flow resistance through the system; however, in other embodiments, it may be advantageous to operate the apparatus at a higher pressure.

Figure 4:
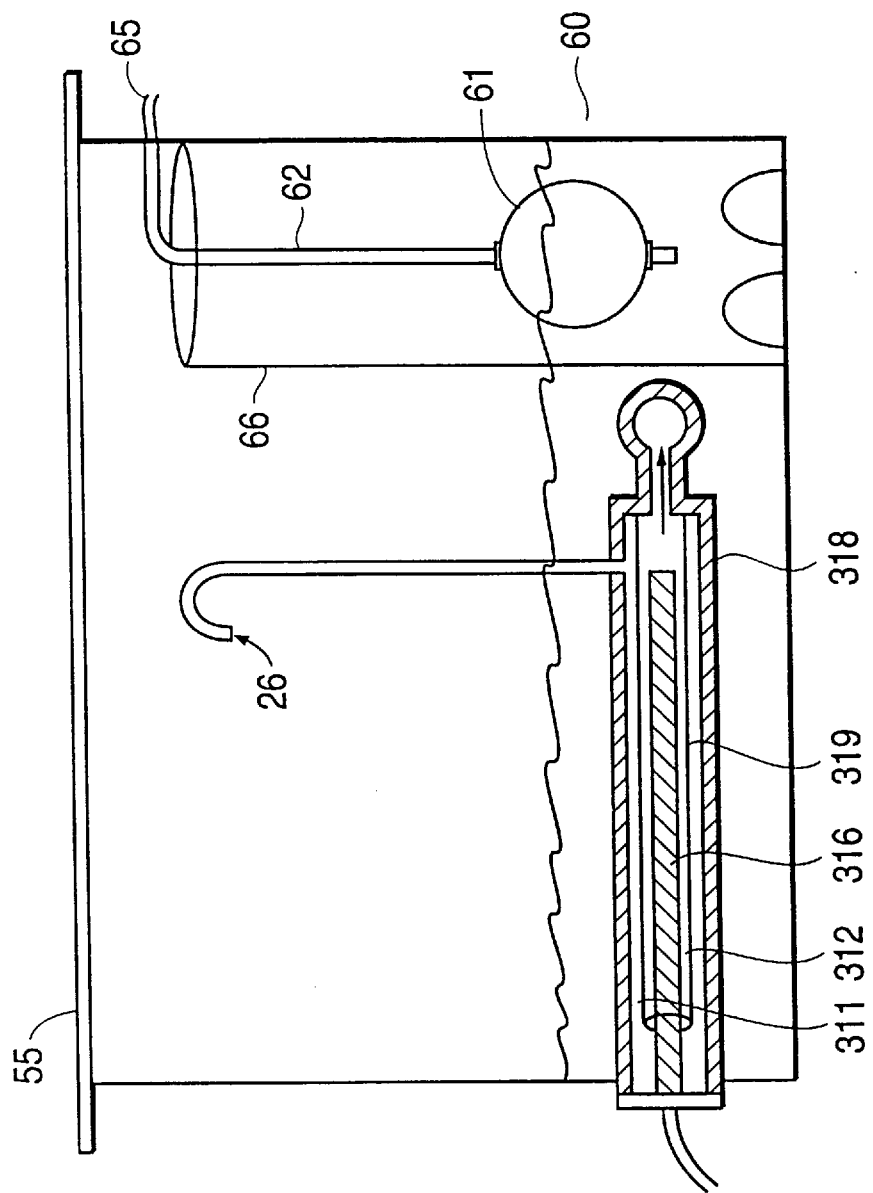
FIG. 4 is an internal side cutaway view of the water purification according to the embodiment of FIG. 3.
Figure 5:
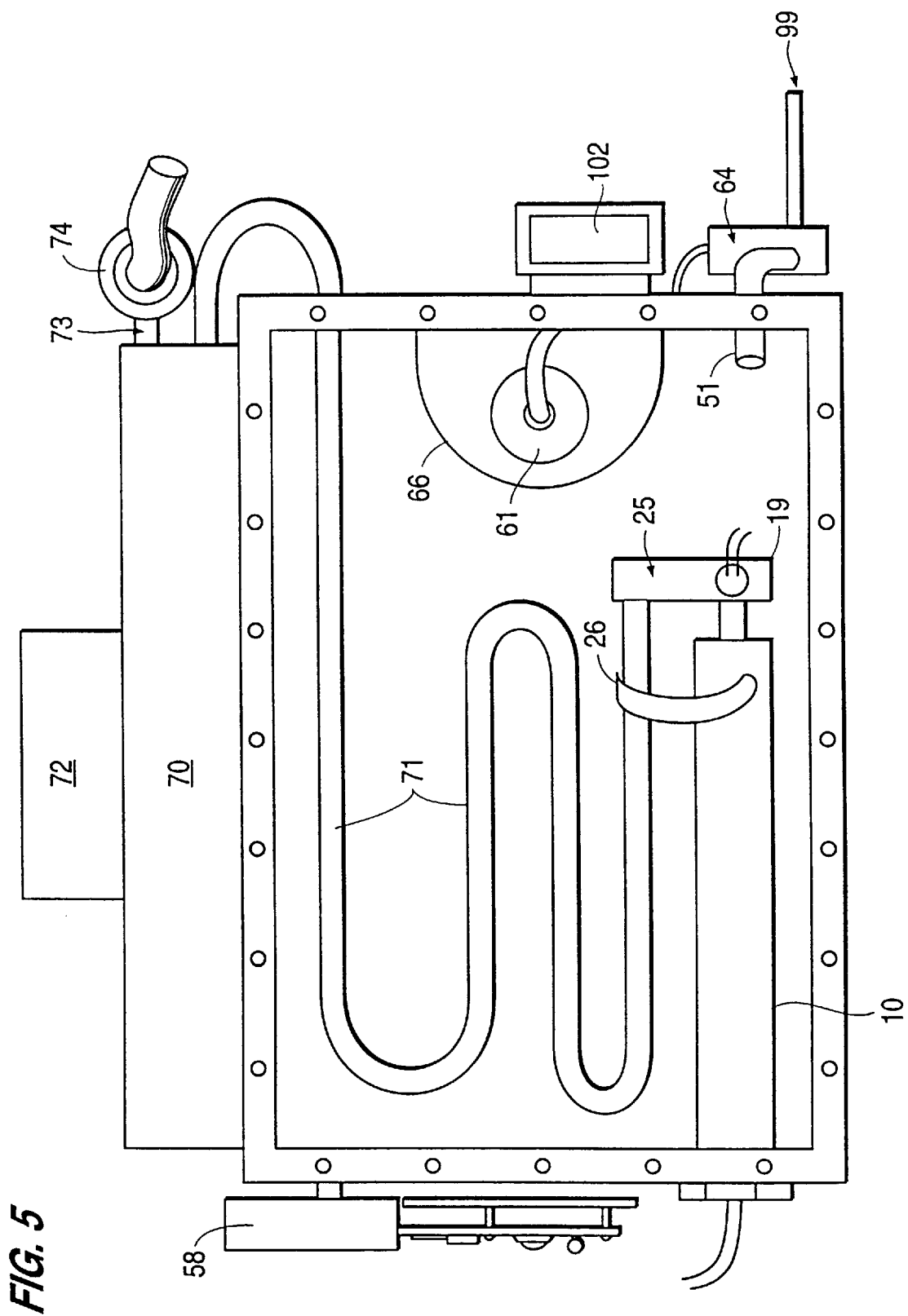
FIG. 5 is a top view of the water purification device according to the embodiment of FIG. 3.

The water purification system may also include a sensing system for maintaining the water level in the tank 50. As best illustrated in FIGS. 4 and 5, a float sensor assembly 60 maintains the water level in the tank 50. The float sensor assembly includes a float 61 having an magnetic element thereon (not shown) which is movably fastened on a hollow rod 62. Inside the hollow rod 62 is a magnetic switch (not shown) which is in electrical communication with solenoid valve 64 through wires 65 and control circuit 130 (described in FIG. 11). A float sensor shield 66 surrounds the float sensor assembly 60. Other water level maintenance means which can be used in the present invention, include optical sensors and mechanical controls such as a float mechanically connected to an inlet valve.

Located in the tank 50 is a steam inlet conduit 26 for admitting saturated steam produced from the boiling water in the tank 50 into heater 10. The steam inlet may be made of any material which can resist saturated steam and can be affixed to the heater 10 by known means. Exemplary materials include metals such as stainless steel, and plastics such as polycarbonate. As shown in FIG. 4, the inlet opening of the conduit preferably opens facing downward toward the surface of the water in the tank 50. This configuration prevents any condensed water, for example, water condensing on tank cover 55, from falling into the conduit.

FIG. 5 illustrates a thermocouple access tube 19 for thermocouple 18 (not shown) which in the embodiment of FIG. 5 is within spring valve chamber 25 located at the exit of heater 10. The thermocouple can be any known in the art suitable for measuring superheated steam in the range of 212° to 2000° F. FIG. 3 illustrates a thermocouple access port 59 located in tank cover 55.

The water purification device also include means to cool and condense the superheated steam which exits from heater 10. In a preferred embodiment as shown in FIG. 5, connecting condenser assembly 70 and heater 10 is a precooling coil 71. Precooling coil 71 has the benefit of transferring the sensible heat of the superheated steam and some of the latent heat of vaporization to the water in tank 50 to assist in the boiling process. In some embodiments, however, it may prove advantageous to direct the superheated steam from the heater to the condenser in the most direct route possible. In such an embodiment, a precooling coil would not be necessary.

Figure 6:
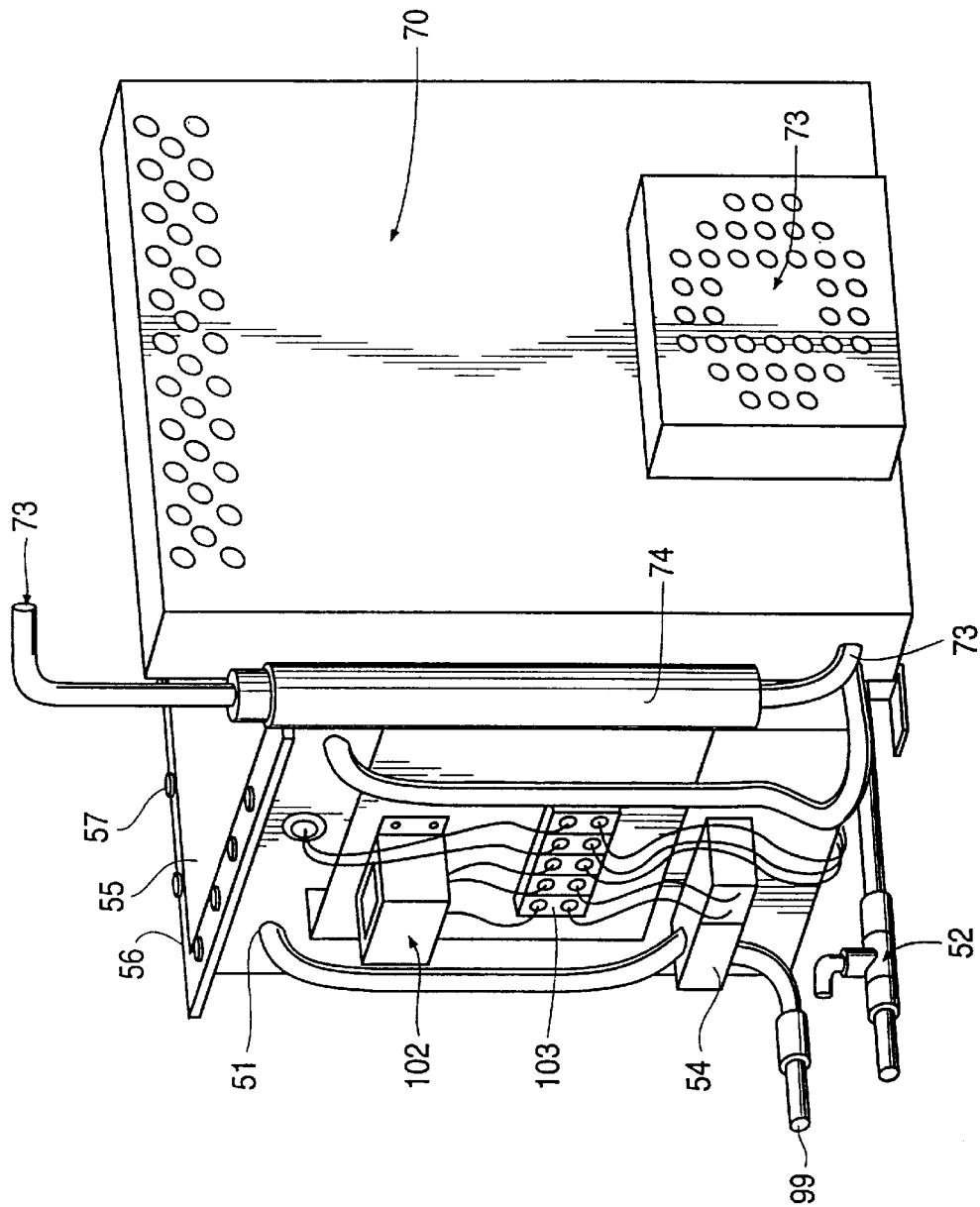
FIG. 6 is a back perspective view of the water purification device according to the embodiment of FIG. 3.

The condenser assembly 70 is best seen in FIGS. 5 and 6 and generally includes tubing (not shown) placed in a serpentine fashion as is known in heat transfer technology. A fan 72 which forces cooling air through the condenser assembly may be optionally employed to increase the amount of heat transfer per unit volume. A condenser outlet 73 transports condensed purified water to further processing or its ultimate use. An additional filter 74 may also be employed if the steam is not superheated to its optimal purity.

The water purification device depicted in FIGS. 3–6 also includes a power supply for supplying power to heater 10, float assembly 60, condenser fan 72 and any other power requirements. As noted, some embodiments of the present invention use a heater which does not use electricity as an energy source. Instead these embodiments use energy derived from sources such as natural or propane gas burner, an oil fired burner or solar energy and the power supply would not provide the energy to superheat the steam. The power supply includes main switch 101 (FIG. 3) for turning on and off power from a power supply source such as an outlet to transformer 102 and triac (not shown). Transformer 102 reduces the AC power, such as that available from most power utilities, into direct current. The triac is used to regulate that AC current going to the heater 10 in embodiments where an electrical heater is used. After transformer 102 an electrical wiring terminal strip 103 is located for directing the electricity received from transformer 102 to its respective uses including the electronic control circuit. As shown in FIG. 3, an electronic control board 104 is provided. The details and functioning of the control board is explained in reference to the description of FIG. 11.

Now description will be made to the preferred embodiments of the heater for superheating the steam according to the present invention.

FIG. 7 illustrates a heater 10 according to one preferred embodiment. The heater 10 includes an outer sleeve 12 an inner sleeve 14 partially disposed through the outer sleeve 12 having a proximal end, and a distal end in the form of an outlet port 14C. The inner sleeve 14 further defines a vapor chamber or interior space 14A and a heating element 15 is disposed within the vapor chamber 14A and is in electrical communication with an external electrical power supply. The heating element 16 is adapted to produce heat in response to electrical energy from the power supply.

A steam inlet tube 26 extends outwardly from the inner tube 14 and is in fluid communication with the vapor chamber 14A and is adapted to direct steam into the vapor chamber 14A. A one way valve 22 is disposed within the vapor chamber 14A adjacent the outlet port 14C, and the valve 22 is adapted to selectively gate the flow of vapor from within the vapor chamber 14A through the outlet port 14C and maintain a desired pressure within the device. The heater 10 is configured to heat the water within the tank to boiling to produce steam, and the steam inlet tube 26. In vapor chamber 14A the steam is superheated through direct contact with the heating element 16 producing vapor. The vapor generates sufficient pressure to open the valve 22 and exit the heating device 10 via internal vapor exit passage 14B and through the outlet port 14C. The spring valve or other flow control means can be adapted to operate at any desired pressure. The inner sleeve outlet port 14C is formed at the distal end of the inner sleeve 14 and is adapted for coupling to an external superheated steam conduit.

The heating element 16 is disposed within the vapor chamber or interior space 14A and is in electrical communication with the external power supply through electrical cables. The heating element 16 having a heating element high temperature portion 16A within the portion of the inner sleeve 14 which is contained within the outer sleeve 12. The heating element further includes a heating element fitting 16B for connection to the cables which produces heat in response to electrical energy from the power supply. Coil 28 is circumferentially disposed around the heating element high temperature portion 16A. A heating element fitting 16B is adapted for coupling with the cables from the power supply.

Thermocouple 18 is connected to the heating element high temperature portion 16A and is in electrical communication with an external control assembly. The thermocouple functions to sense the temperature of the heating element high temperature portion 16A. Alternatively, the thermocouple may be arranged such that it directly measures the temperature of the superheated steam. Insulation 20 is disposed between the outer sleeve 12 and the inner sleeve 14 and functions to insulate the heater 10.

As described above, one way valve 22 is disposed within the vapor chamber 14A between the vapor exiting passage 14B and the outlet port 14C and functions to selectively gate vapor out of the outlet port 14C and control operating pressure. A tension spring 24 is attached to the valve 22 and functions to bias the valve into a closed position.

Figure 8:
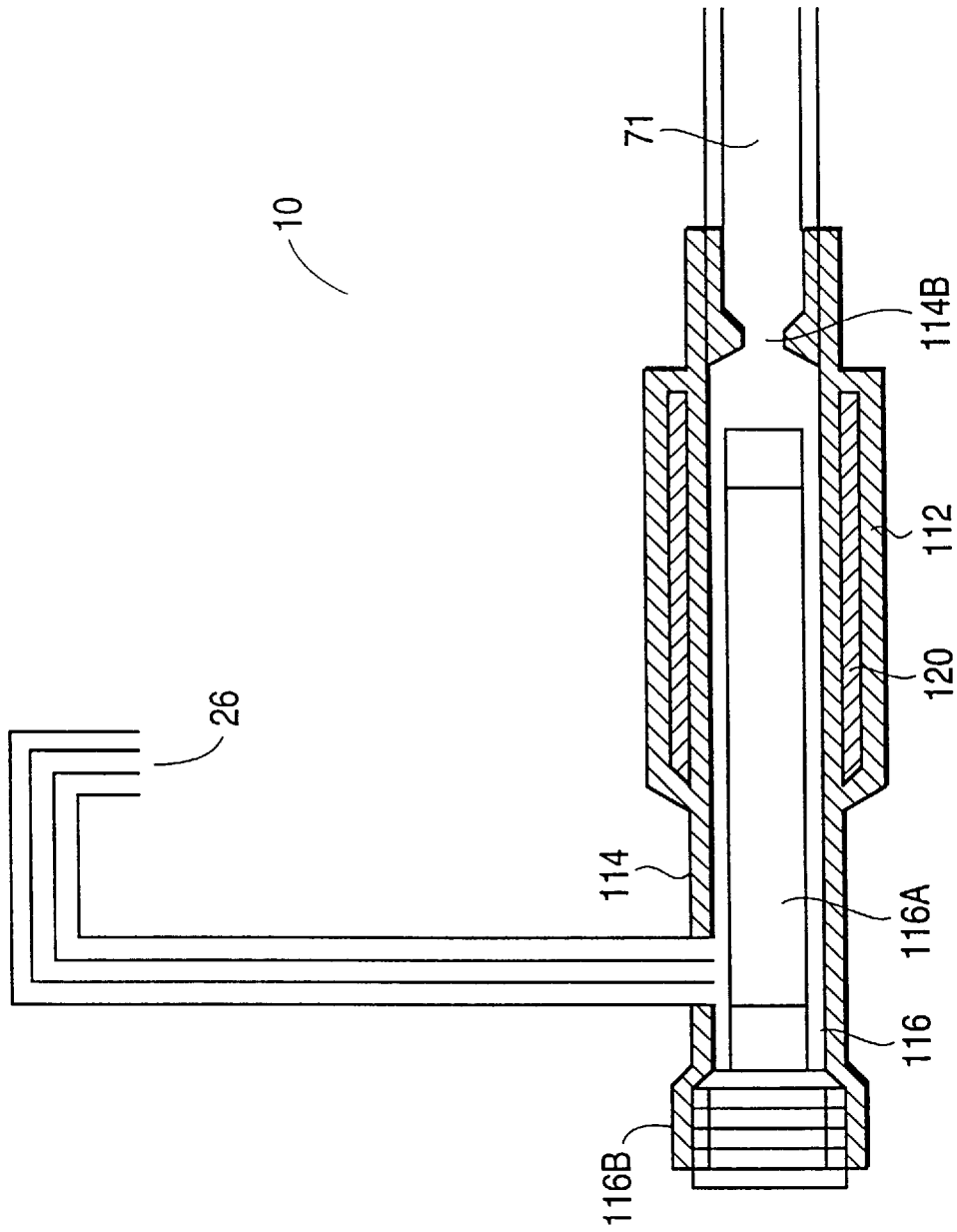
FIG. 8 is a side cutaway view of a heater constructed in accordance with another preferred embodiment of the present invention.

FIG. 8 illustrates another embodiment of a preferred heater according to the present invention which is similar to the embodiment shown in FIG. 7. In the heater shown in FIG. 8, there is no valving at the exit or outlet 114B of the heater. The absence of a valve or other similar arrangement allows the superheated steam to immediately pass out from the heater. FIG. 8 also illustrates an embodiment wherein the high temperature portion 116A of the heating element 116 does not extend the entire length of the vapor chamber. Also illustrated in FIG. 8 are inner 114 and outer 112 sleeves; interior space or vapor chamber 114A; and insulation 120.

Figure 9:
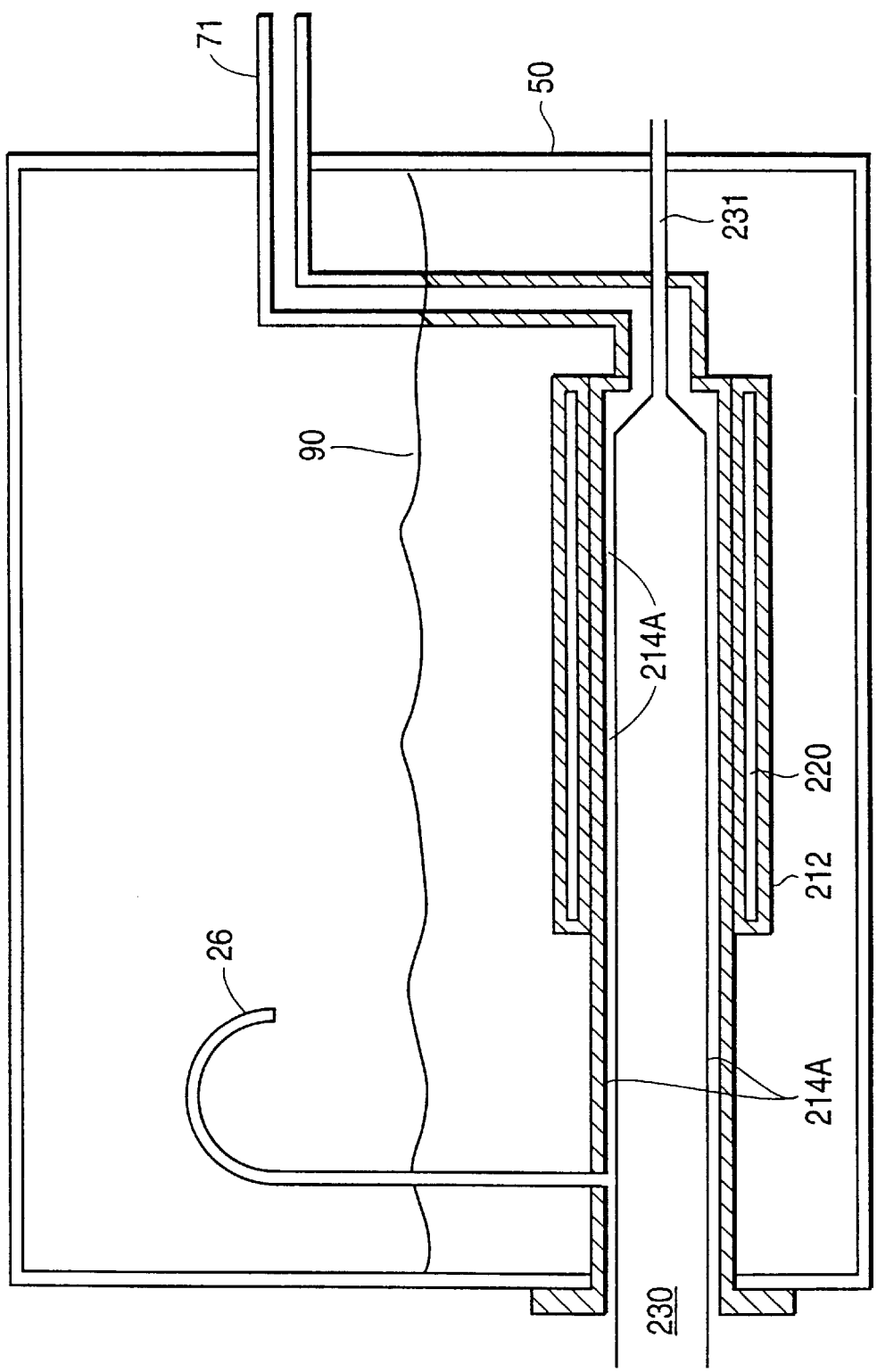
FIG. 9 is a side cutaway view of a heater constructed in accordance with another preferred embodiment of the present invention.

FIG. 9 illustrates a heater embodiment which employs a heat source which produces a waste gas exhaust, such as a liquid or gaseous fossil fuel. In this embodiment, the side of the heater attached to the wall of the raw water boiling tank 50 is connected to a burner or other like device not shown in FIG. 9. The burner will produce a flame which can extend along the length of the heater in a hollow heat source chamber 230. The heat source chamber 230 is surrounded by the interior space or vapor chamber 214A with heat transfer taking place between the two chambers. At the opposite end of the burner or heat source is an exhaust removal conduit 231 for the gaseous waste products. The exhausts advantageously passes through the raw water supply 90 to transfer its residual heat to assist in boiling the raw water. Also illustrated in FIG. 9 are inner 214 and outer 212 sleeves and optional insulation 220.

Figure 10:
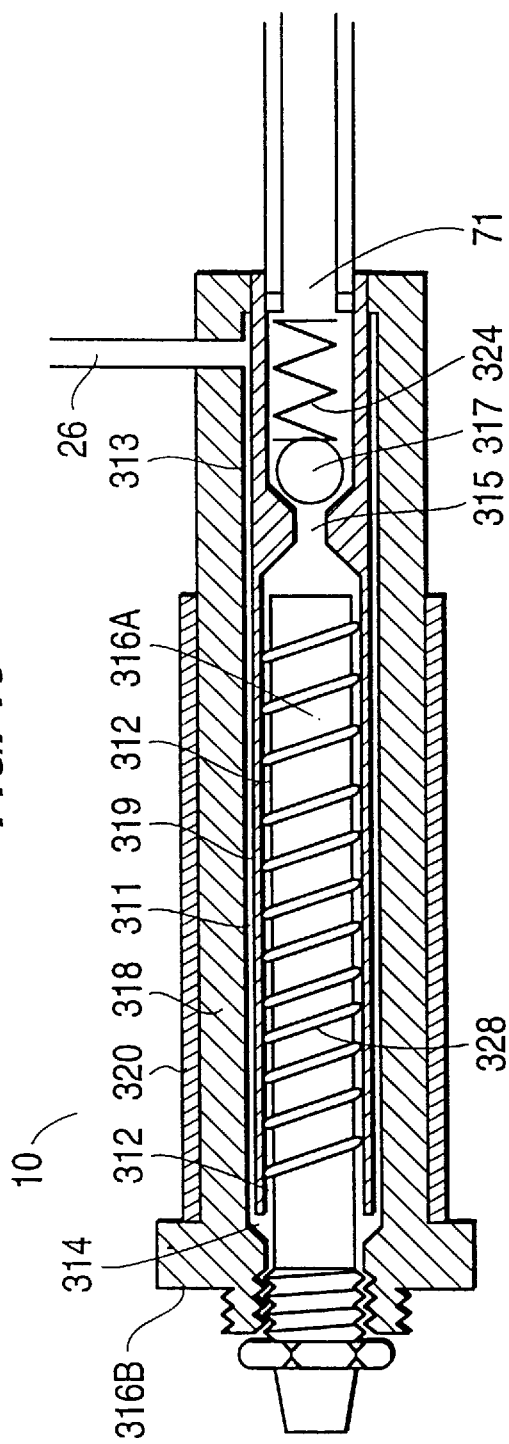
FIG. 10 is a side cutaway view of a heater constructed in accordance with another preferred embodiment of the present invention.

FIG. 10 illustrates yet another embodiment of the heater according to the present invention. In the embodiment exemplified in FIG. 10, the vapor or interior space is divided into a first space 311 which surrounds a second space 312. In FIG. 10, this is illustrated as a tube within a tube configuration. The steam enters into the first space at a first end thereof 313 and travels along the length until it reaches the opposite end thereof 314. At the opposite end 314, the first and second spaces are in communication with one another allowing the steam to transfer between the two sections. In the second space 312, the majority of the superheating takes place. The heating element 316 is preferably located within the second space, thus providing the second space with the most direct exposure to the heat source.

In the embodiment shown in FIG. 10, the heating element 316A is wound with a spring-like device or coil 328 which provides a larger heated surface area to contact the steam traveling the length of the second space. The superheated steam exits the heater through exit port 315 and check valve 317 which has been described above. Optional insulation 320 can surround all or a portion of the heater as shown in FIG. 10. If insulation is used, there must be sufficient heat transfer to the raw water reservoir in order to boil the raw water. Also shown in FIG. 10 are outer and inner sleeves 318 and 319 respectively.

Figure 11:
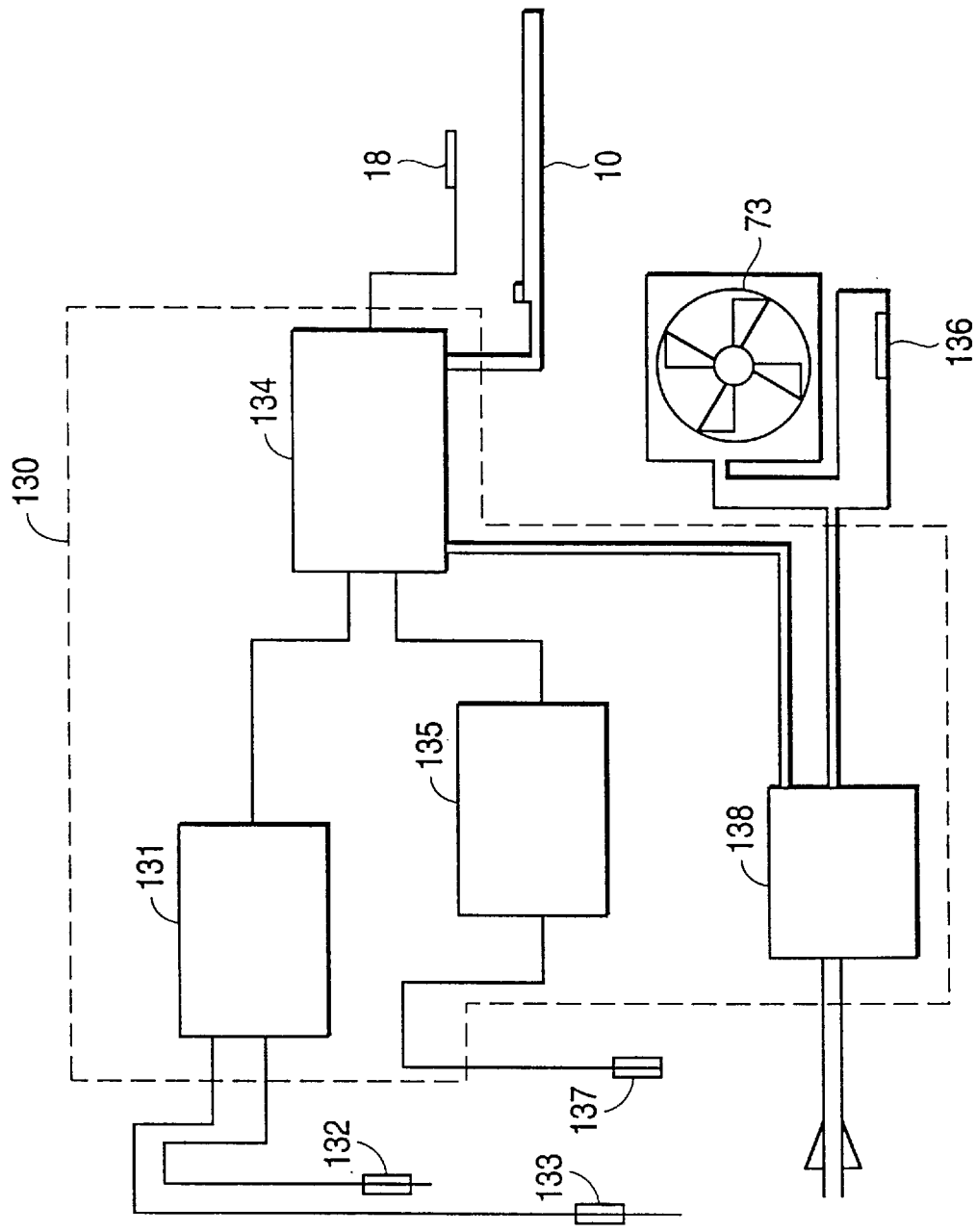
FIG. 11 is a flow diagram of a preferred electronic control circuit embodiment.

FIG. 11 is a schematic diagram of a control circuit according to one preferred embodiment of the present invention. In the control circuit 130, a part of which may be on control board 104, power supply 138 is provided. Also included are two water level sensing circuits. The first circuit or pure water level sensing circuit 131 includes high 132 and low level 133 magnetic sensors. These sensors detect the water level in the purified water reservoir 80. When water in reservoir 80 is low, the low water sensor is activated which signals the heater control circuit 134 to turn on the heater 10 and begin purification of water until sufficient purified water is added to reservoir 80 to raise the water level to activate high water sensor 132. At this point, the heater control circuit turns off the heater 10.

The second sensing circuit or raw water tank sensing circuit is part of the sensing system for maintaining the water level in the raw water boiling tank 50. This sensing circuit 135 includes a single high water level sensor 137, such as the float sensor assembly 60 described above. When the water purification device 30 is in operation, the water level in tank 50 slowly drops. When it drops to a predetermined level, the sensor 137 signals the control circuit which in turn activates solenoid valve 64 and allows raw feedstock water 99 to enter tank 50 to a predetermined depth. When this predetermined depth is reached, the sensor 137 signals the control circuit to close the solenoid valve 64.

In a particularly preferred embodiment, the raw water boiling tank level circuit is designed such that the solenoid is activated for more frequent and shorter periods of time to allow smaller and more frequent amounts of water into the raw water boiling tank. This is more readily accomplished by the single sensor system than a dual sensor system. Shorter and more frequent filling intervals are generally desired because, when large amounts of raw water are admitted into the raw water boiling tank, the boiling of the water therein stops until the newly added water is heated to the boiling point. By allowing smaller amounts of raw water into the boiling tank this cooling action on the boiling water is minimized. In some embodiments, the amount of raw water admitted by solenoid valve in each cycle is $\leq 5\%$ by weight of the total amount of water in the raw water boiling tank 50, more preferably $\leq 3\%$ and even more preferably $\leq 1\%$.

When the control circuit 130 is signaled by the low water level sensor 133 in the reservoir 80, the heater 10 is activated. The amount of electricity to the heater is determined by the preselected temperature at which the heater will operate at. This in turn is sensed by thermocouple 18 in the heater. The thermocouple is in electrical communication with a theristat type circuit (not shown) which determines the amount of time the triac is turned on. The amount of time the triac is on, correlates to the predetermined temperature the heater will operate at.

When the high water sensor 132 is activated, the sensor signals the control circuit to turn off the heater. At the same time, the solenoid valve 64 is signalled to open and allow a larger than normal amount of water into the raw water boiling tank. This influx of cold water abruptly ceases the boiling in tank 50, which ensures that no further steam enters into the interior space of the heater. This minimizes unprocessed and unpurified steam from entering the condenser, a generally undesired condition called "blow by."

In this state of cool down, the electronic circuit 130 maintains a state of stand by, waiting for the purified water reservoir to be emptied and trigger the low water level sensor 133 to start the boiling process again to refill the tank 80.

The control circuit may also be used to control the operation of cooling fan 73 for the condenser assembly 70. A temperature sensor 136 can be mounted onto the condenser coils only when needed. This in turn conserves energy and aids the condensing process.

Reference will now be made to the operation and control of the purification device. The heater is energized either manually, e.g., an on/off switch, or automatically, e.g., by sensing a low water level in the purified water reservoir (described above). The heater brings the raw water to boiling. At this point, the steam enters into the heater were it is subjected to superheating.

The duration and degree of superheating depends on several factors. Such factors include types and amounts of impurities present in the raw water and the desired level of purification. Those skilled in the art are able to determine suitable superheating times and temperatures. In a preferred embodiment, substantially all impurities are removed or destroyed. In those instances were there are high original levels of contaminants or impurities, "substantially all" is defined as less than 50% by weight of original impurities remaining. In embodiments with lower levels of impurities, "substantially all" is defined as less than 10% by weight of the amount of original impurities remaining, more preferably less than 5%, and even more preferably about 0%. In some instances, it is more important to reduce the levels of organisms than inorganic or organic chemicals. If this is the case, then superheating is effected until substantially all the organisms are destroyed.

The duration of superheating depends on several factors including the dimensions of the heater and the temperature at which the heater is operating. Generally the steam is maintained at its peak or desired temperature for a time sufficient to remove or destroy all or substantially all the impurities present therein. The duration of superheating also depends on the time it takes to raise the steam to its desired temperature. This is expedited by increasing the surface area of the heating element 16 to maximize the contact of the heating element with the steam. Coils 28 and 328 as described above, are advantageous for increasing the contact surface area of the heating element.

The temperature that the steam is heated to likewise depends on the amounts and types of impurities present in the raw water and the desired level of purification. Generally, the steam is heated to a point sufficient to remove or destroy the impurities present therein. Preferably, this temperature is greater than 212° F., more preferably $\geq 700°$ F., even more preferably $\geq 1000°$ F. Of course, the temperature at which the steam is heated to will also depend on its superheating time.

The pressure within the water purification device is controlled by several factors. When there are no additional flow control means, the pressure is generally determined by the constriction of the flow of superheated steam through the heater 10. For example, in an embodiment with a narrowed vapor exit port such as that shown in FIG. 8, depending on the amount of steam that is being generated, the pressure is generally $\leq 8$ psig.

In some instances it may be desirable to operate the device at more elevated pressures. Generally the pressure in the device will be maintained at $\leq 15$ psig, more preferably $\leq 10$ psig. One way to control the pressure in the device is through the flow control means located at the output end of the heater 10. For example, when a spring valve is used, the spring which biases the valve against the exit or outlet port of the heater can be selected with a spring constant to provide the desired pressure.

After superheating, the steam exits the heater and enters a condenser where it is condensed into liquid water. The water can then be transported to a purified water reservoir for later use, or it can be transported directly to the point of use.

In some uses, it may not be desirable to use the initial amount of steam exiting the heater, due to the fact that this steam may not be as highly purified due to lower warmup temperatures of the heater. In these cases, the initial amounts of steam can be diverted out of the device and discarded. Alternatively, the valve mechanism at the output of the heater, such as the spring ball valve described above can be operated such that the steam is retained in the heater and heated until a preselected pressure, temperature or time is reached. When the preselected condition is reached, the valve will open and allow the fully superheated steam to pass into the condenser.

The condensate can be measured for impurities by any well known technique. In the case of chemical impurities, it is convenient to measure the specific conductance of the water. The specific conductance correlates with the amount of chemicals present in the water, with increasing amounts of chemicals resulting in higher specific conductivity.

The output of the device depends on several factors, including the size of the heater and the degree of superheating to which the steam is subjected. A typical countertop model will have an output of about 1 quart/hr per 500 watts of energy.

While the invention has been illustrated and described in the foregoing preferred embodiments, it is not intended to be limited to the details shown, since it will be understood that various omissions, modifications, substitutions and changes in the forms and details of the device illustrated and in its operation can be made by those skilled in the art without departing in any way from the spirit of the present invention.

What is claimed is:

1. A water purifier, comprising:
    a raw water reservoir; a heater at least partially disposed within the raw water reservoir and including a heat source, an inlet for steam and an outlet for superheated steam; an inlet conduit in fluid communication with the inlet of the heater for transporting steam produced by boiling said raw water; and a condenser in fluid communication with the outlet of the heater, wherein the heater both boils the raw water to produce a substantially saturated steam and superheats the substantially saturated steam, and wherein the heater comprises a water-tight interior space in fluid communication with the inlet and the outlet, and wherein the heat source is at least partially disposed within the interior space.

2. A water purifier as claimed in claim 1, further comprising a purified water reservoir in fluid communication with the condenser.

3. A water purifier as claimed in claim 1, wherein the heat source is an electric heat source.

4. A water purifier as claimed in claim 3, wherein the electric heat source includes an electrical resistance element.

5. A water purifier as claimed in claim 1, wherein the heat source is a combustion burner.

6. A water purifier as claimed in claim 5, wherein the fossil fuel heat source contains one or more of natural gas, propane gas, heating oil, alcohol, gasoline and diesel fuel.

7. A water purifier as claimed in claim 6, wherein the heat source further comprises an exhaust passage for combusted gases.

8. A water purifier as claimed in claim 1, wherein the interior space is divided into at least two sections, a first section and a second section, wherein the material between the exterior of the heater and the interior space has a thermal conductivity in the first section which is greater than the thermal conductivity in the second section.

9. A water purifier as claimed in claim 8, wherein the heat source is at least partially disposed within both the first and second sections.

10. A water purifier as claimed in claim 8, wherein the material in the second section further comprises a thermal insulation material.

11. A water purifier as claimed in claim 8, wherein the inlet opens into the first section and the outlet opens into the second section.

12. A water purifier as claimed in claim 1, wherein the interior space further comprises a first space and a second space and wherein the first space at least partially surrounds the second space in a direction extending the length of the heater.

13. A water purifier as claimed in claim 12, wherein the first space substantially completely surrounds the second space.

14. A water purifier as claimed in claim 12, wherein the heat source is at least partially disposed within said second space.

15. A water purifier as claimed in claim 12, wherein the inlet opens into the first space and the outlet opens into the second space.

16. A water purifier as claimed in claim 15, wherein the inlet and outlet are both located in the vicinity of one another.

17. A water purifier as claimed in claim 15, wherein the inlet and outlet are both located in the vicinity of a first end of the heater.

18. A water purifier as claimed in claim 17, wherein the inlet, outlet first and second spaces are arranged such that steam which enters through the inlet, travels through the first space, passes into the second space, travels through the second space and exits the outlet.

19. A water purifier as claimed in claim 12, wherein the heater further comprises a first and second tube, wherein the second tube is at least partially disposed within the first tube to form a tube within a tube configuration, and wherein the first space includes at least a portion of the space bounded by the inner major surface of the first tube and the outer major surface of the second tube, and the second space includes at least a portion of the interior of the second tube.

20. An apparatus for purifying water, comprising:
    (a) reservoir means for holding raw water;
    (b) heater means at least partially disposed within the raw water for boiling the raw water within the reservoir to produce steam in a substantially saturated state and for heating the steam produced therein for a time and at a temperature sufficient to superheat the steam;
    (c) first fluid communication means for transporting the substantially saturated steam from the reservoir to the interior of the heater;
    (d) second fluid communication means transporting at least a portion of the superheated steam to a condenser; and
    (e) condenser means for condensing at least a portion of the transported steam, to produce a purified water, wherein the heater means comprises a water-tight interior space in fluid communication with the first fluid communication means and the second fluid communication means, and a heat source which is at least partially disposed within the interior space.

21. An apparatus as claimed in claim 20, wherein the heater superheats the steam to a temperature to a temperature of $\geq 212°$ F.

22. An apparatus as claimed in claim 20, wherein the heater superheats the steam to a temperature to a temperature of $\geq 700°$ F.

23. A method for purifying water, comprising:
    (a) providing a reservoir of raw water;
    (b) boiling the raw water within the reservoir with a heater at least partially disposed within the water to produce steam in a substantially saturated state;
    (c) transporting the steam to a water-tight interior space of the heater;
    (d) heating the steam within at least a portion of the heater for a time and temperature sufficient to superheat the steam;
    (e) transporting at least a portion of the superheated steam to a condenser; and
    (f) condensing at least a portion of the transported steam, to produce a purified water, wherein the water-tight interior space is in fluid communication with an inlet which transports the steam to the interior space of the heater and an outlet which transports the superheated steam away from the interior space, and wherein a heat source is at least partially disposed within the interior space.

24. A method as claimed in claim 23, wherein the steam is superheated for a time and to a temperature to breakdown and destroy substantially all organisms and organic and inorganic chemical contaminants.

25. A method as claimed in claim 24, wherein the steam is superheated for a time and to a temperature to reduce the organic chemicals to an amount which is less than the amount in the raw water.

26. A method as claimed in claim 24, wherein the specific conductance of the purified water is less than the amount in the raw water.

27. A method as claimed in claim 23, wherein the steam is superheated to a temperature $\geq 212°$ F.

28. A method as claimed in claim 23, wherein the steam is superheated to a temperature $\geq 700°$ F.

29. A method as claimed in claim 23, wherein the steam is superheated to a temperature $\geq 1000°$ F.

30. A method as claimed in claim 23, wherein the flowrate of the steam is about 1 quart/hour per 500 watts.

31. A method as claimed in claim 23, wherein the pressure in the heater is $\leq 15$ psig.

32. A method as claimed in claim 23, wherein the pressure in the heater is $\leq 10$ psig.

33. A method as claimed in claim 23, wherein the steam is initially held in the interior of the heater until the steam is at a preselected temperature, time or pressure.

34. A method as claimed in claim 23, wherein the steam is initially held in the interior of the heater until the steam is at a preselected pressure which is determined by a pressure-actuated valve located in the vicinity of an outlet of the interior of the heater.

35. A water purifier as claimed in claim 1, wherein heat source within the interior space is enclosed in a housing.

36. A water purifier as claimed in claim 1, further comprising a pressure actuated valve disposed in the outlet.

37. A water purifier as claimed in claim 1, wherein the inlet conduit extends in a direction away from the heater and into the raw water reservoir.

38. A water purifier as claimed in claim 8, wherein the second section of the heater is at least partially disposed in the raw water reservoir.

39. A water purifier as claimed in claim 8, wherein the ratio of the surface area of the exterior of the heater which encompasses the first section to the second section is in the range of 1:1 to 10:1.

* * * * *